(12) United States Patent
Singh

(10) Patent No.: US 9,843,669 B1
(45) Date of Patent: Dec. 12, 2017

(54) PERSONALIZING THE AUDIO VISUAL EXPERIENCE DURING TELECOMMUNICATIONS

(71) Applicant: INTERNATIONAL BUSINESS MACHINES CORPORATION, Armonk, NY (US)

(72) Inventor: Alok K. Singh, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 15/226,708

(22) Filed: Aug. 2, 2016

(51) Int. Cl.
| | |
|---|---|
| *H04M 3/42* | (2006.01) |
| *H04M 1/64* | (2006.01) |
| *H04M 1/2745* | (2006.01) |
| *G10L 19/018* | (2013.01) |
| *G06Q 30/02* | (2012.01) |

(52) U.S. Cl.
CPC .... *H04M 3/42017* (2013.01); *G06Q 30/0251* (2013.01); *G10L 19/018* (2013.01); *H04M 1/274508* (2013.01); *H04M 3/42221* (2013.01)

(58) Field of Classification Search
CPC .... H04M 3/436; H04M 3/42; H04M 2201/41; H04M 3/4936; H04M 3/385; H04M 3/4876; H04M 3/493; H04M 3/533
USPC .................... 379/201.01, 88.02, 71
See application file for complete search history.

(56) References Cited

U.S. PATENT DOCUMENTS

| | | |
|---|---|---|
| 8,848,879 B1 | 9/2014 | Coughlan et al. |
| 2014/0161250 A1 | 6/2014 | Leeds et al. |
| 2015/0163561 A1* | 6/2015 | Grevers, Jr. ......... H04N 21/812 704/235 |
| 2015/0220630 A1* | 8/2015 | Romano ........... G06F 17/30719 707/755 |
| 2016/0044112 A1 | 2/2016 | Dornich et al. |
| 2016/0044162 A1 | 2/2016 | Zampiello |

* cited by examiner

*Primary Examiner* — Rasha Al Aubaidi
(74) *Attorney, Agent, or Firm* — Tutunjian & Bitetto, P.C.; Scott Dobson

(57) ABSTRACT

A method and system are provided. The method includes identifying content in a telecommunication session between a caller and one or more other parties. The method further includes dynamically personalizing media provided to the caller on a telecommunication device during at least a portion of a subsequent telecommunication session between the caller and at least one of the one or more other parties based on the identified content in the telecommunication session. The telecommunication session occurs prior to the subsequent telecommunication session.

19 Claims, 5 Drawing Sheets

PERSONALIZING THE AUDIO VISUAL EXPERIENCE DURING TELECOMMUNICATIONS

BACKGROUND

Technical Field

The present invention relates generally to telecommunications and, in particular, to personalizing the audio visual experience during telecommunications.

Description of the Related Art

As is known, a user initiating a call is referred to as the "caller", while the user being called/receiving the call is referred to as the "callee". During mobile communication, the typical caller experience is predefined and static. For example, when a caller initiates a call, the caller listens to a typical ringing tone or other pre-set sounds while the call is being connected to the callee. Thus, for each call, the caller essentially experiences the same audio experience. When the caller is in a conversation using a smart device (e.g., a smart phone, a tablet, a laptop, etc.), the caller may use a "call extension device" such as, for example, a headphone or a speaker, where the speaker is configured to operate in a speakerphone mode. During that time, the device display screen may show the static "ongoing call" icon with a timer or a picture of the callee or a wall paper of the caller's choice.

Caller tunes and reverse caller tunes have been used for quite some time. In such a case, the user can select any audio clippings for such tunes. However, such an approach is static, and requires the user to set the caller tunes at the service provider server or use a third party application to set a local caller tune.

In such scenarios, the caller's audio visual experience essentially does not change and is limited and static. Thus, there is a need for personalizing the audio visual experience during telecommunications.

SUMMARY

According to an aspect of the present principles, a method is provided. The method includes identifying content in a telecommunication session between a caller and one or more other parties. The method further includes dynamically personalizing media provided to the caller on a telecommunication device during at least a portion of a subsequent telecommunication session between the caller and at least one of the one or more other parties based on the identified content in the telecommunication session. The telecommunication session occurs prior to the subsequent telecommunication session.

According to another aspect of the present principles, a computer program product is provided for personalizing telecommunications. The computer program product includes a non-transitory computer readable storage medium having program instructions embodied therewith. The program instructions are executable by a computer to cause the computer to perform a method. The method includes identifying content in a telecommunication session between a caller and one or more other parties. The method further includes dynamically personalizing media provided to the caller on a telecommunication device during at least a portion of a subsequent telecommunication session between the caller and at least one of the one or more other parties based on the identified content in the telecommunication session. The telecommunication session occurs prior to the subsequent telecommunication session.

According to yet another aspect of the present principles, an apparatus is provided. The apparatus includes a telecommunication device having a processor and a memory. The telecommunication device is configured to identify content in a telecommunication session between a caller and one or more other parties. The telecommunication device is further configured to dynamically personalize media provided to the caller on the telecommunication device during at least a portion of a subsequent telecommunication session between the caller and at least one of the one or more other parties based on the identified content in the telecommunication session. The telecommunication session occurs prior to the subsequent telecommunication session.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to personalizing the audio and/or visual experience during telecommunications.

In particular, in a conversation between a caller (initiator of the call) and a callee (recipient of the call), the present principles are directed to the caller and the audio and/or visual media presented to the caller. It is noted that caller tunes/sounds are different from a ringing tone, as the caller tunes/sounds are heard by the caller whereas ringing tone is heard by the callee in order for the callee to be notified of the incoming call. Of course, the caller may also hear the ringing tone if the caller has not pre-selected a different, but nonetheless static, option.

In an embodiment, the present principles can be directed to the following scenario. While a call is being connected, there is small window of time that is occupied by ring tones or other pre-set sounds. Once the call is connected, the caller may use call extension devices during that period while keeping the device display screen on.

Advantageously, the present principles provide a mechanism where a caller's previous communications can be summarized and/or snippets identified, and audio corresponding thereto can be used as a caller tune and/or text and images corresponding thereto can be streamed and/or otherwise provided to the user's device (e.g., smartphone) during the communication. Such previous communications can involve, but are not limited to, any audio and textual medium using any connected source e.g., messengers, social media, and so forth. It is to be appreciated that a previous call summary for the caller can be personal to the caller and, is, thus, only heard on the caller's side.

As used herein for the purposes of the present principles, the term "caller tune" or "tune" in short, as well as plural versions of the preceding, can refer to sounds obtained and provided in accordance with the teachings of the present principles. For example, such tunes can include portions of a previous audio conversation(s) between the caller and one or more other participants in the audio conversation(s). Moreover, such tunes can also refer to visual media that can be displayed to a caller, where such visual media can include portions of a previous visual-based conversation(s) between the caller and one or more other participants in the visual-based conversation(s).

Figure 1:
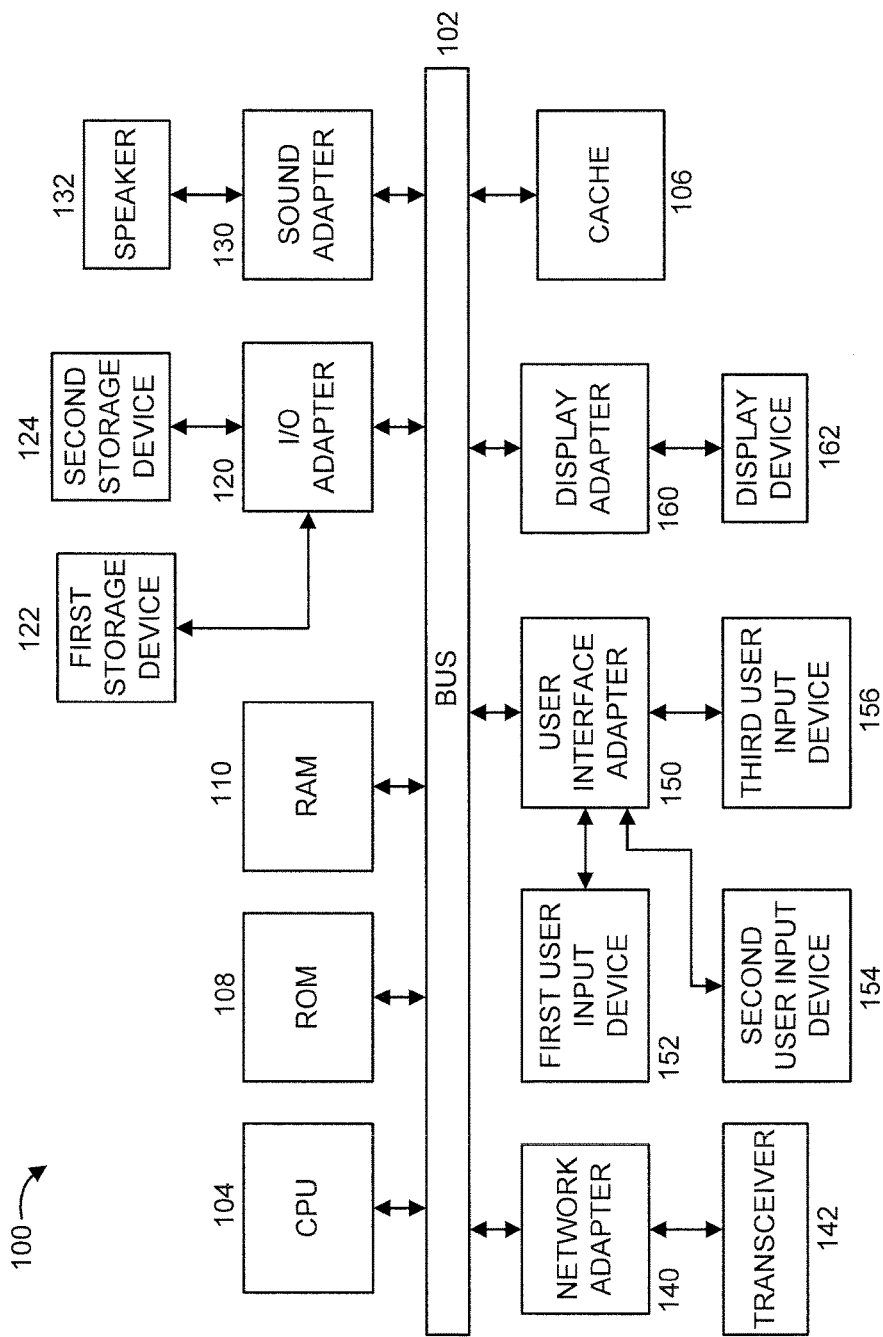
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
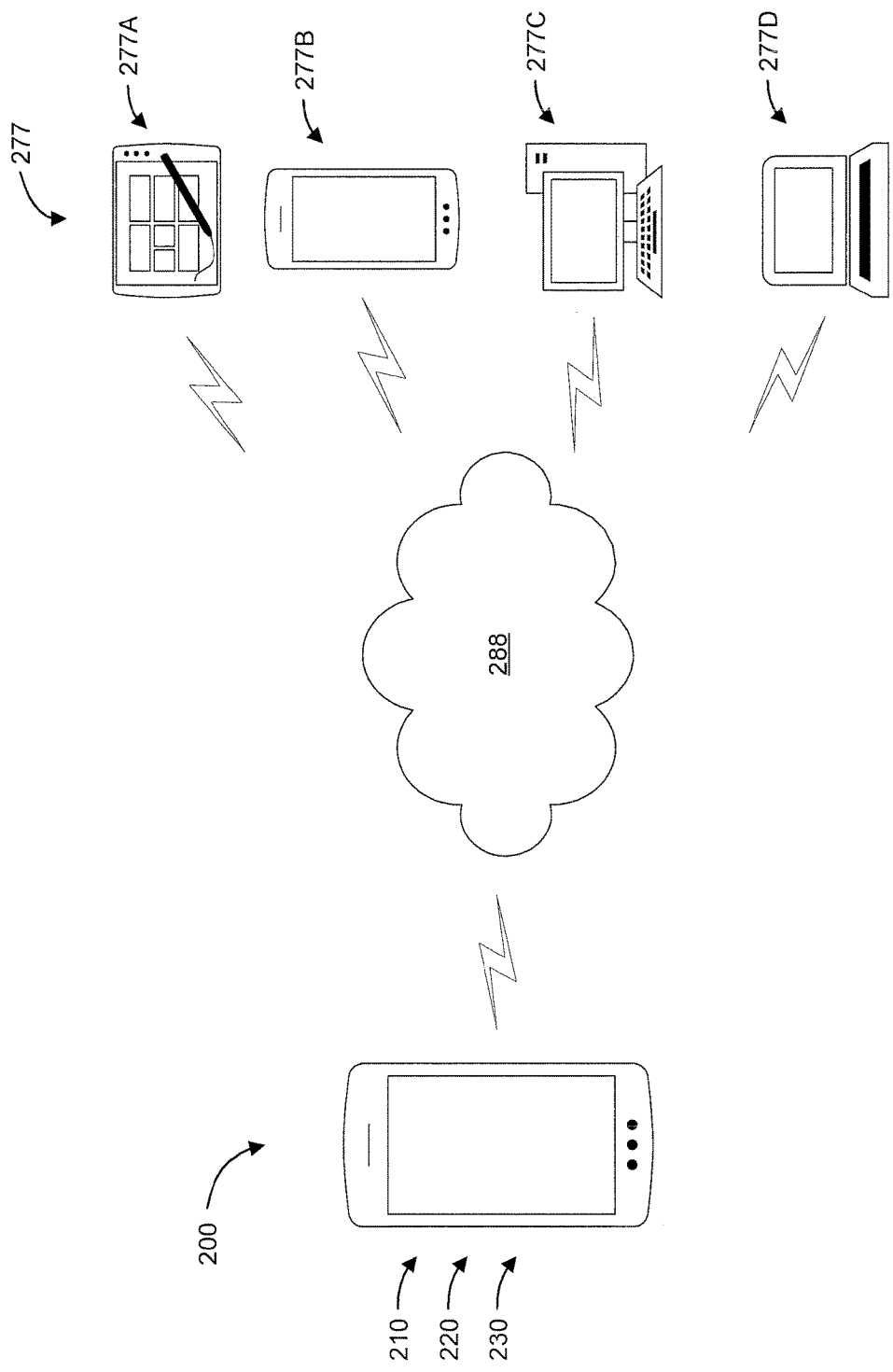
FIG. 2 shows an exemplary apparatus 200 for personalizing telecommunications for a caller and an operating environment of the apparatus 200, in accordance with an embodiment of the present principles.

Moreover, it is to be appreciated that apparatus 200 described below with respect to FIG. 2 is an apparatus for implementing respective embodiments of the present principles. Part or all of processing system 100 may be implemented in one or more of the elements of apparatus 200.

Figure 3:
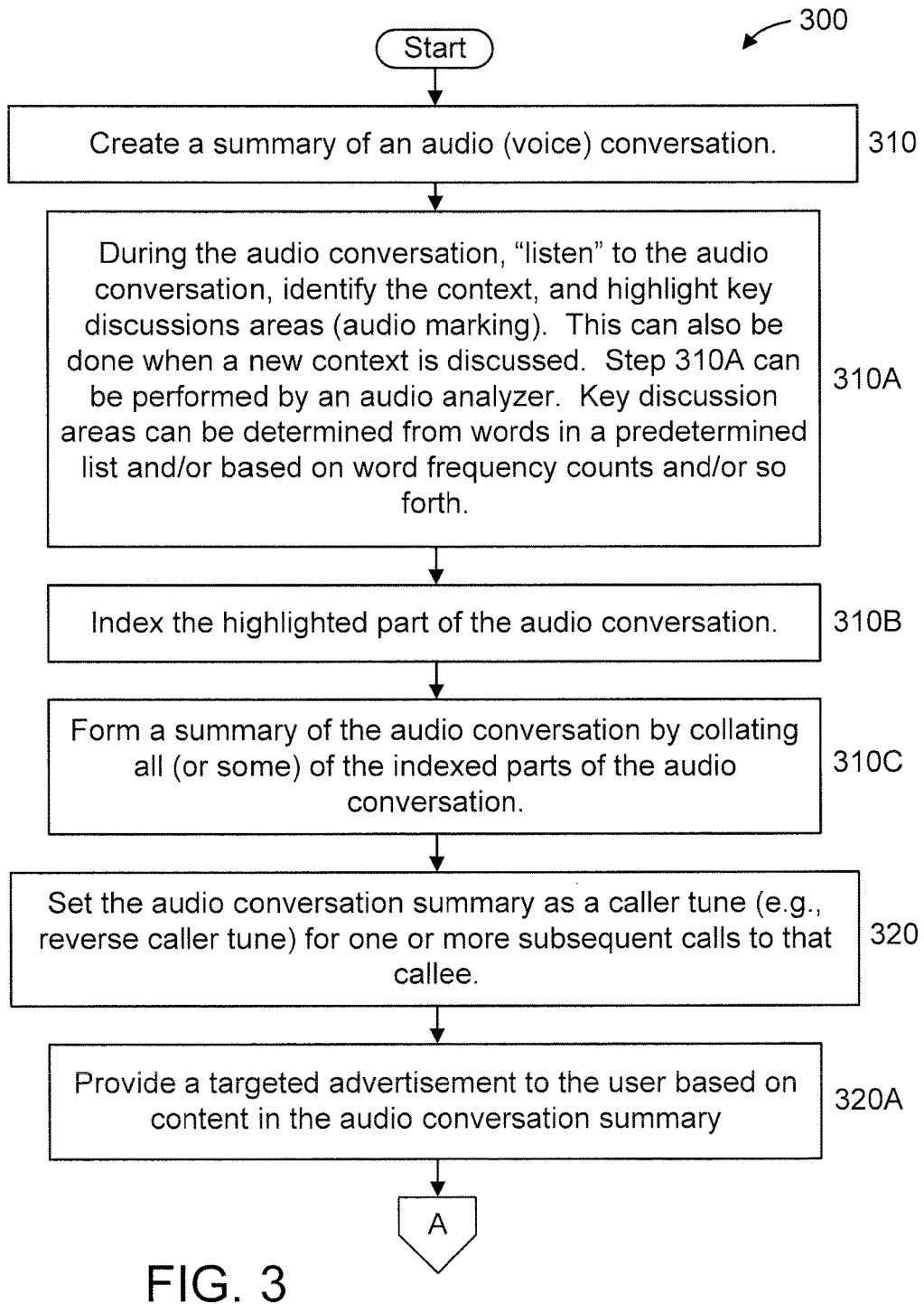
FIGS. 3-4 show an exemplary method 300 for personalizing the audio experience of a caller during telecommunications, in accordance with an embodiment of the present principles.
Figure 4:
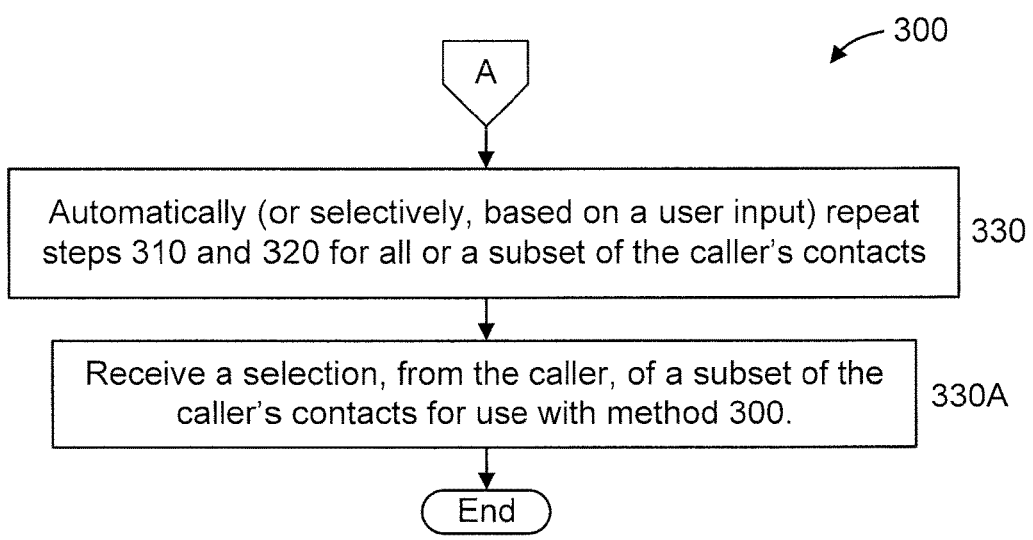
Figure 5:
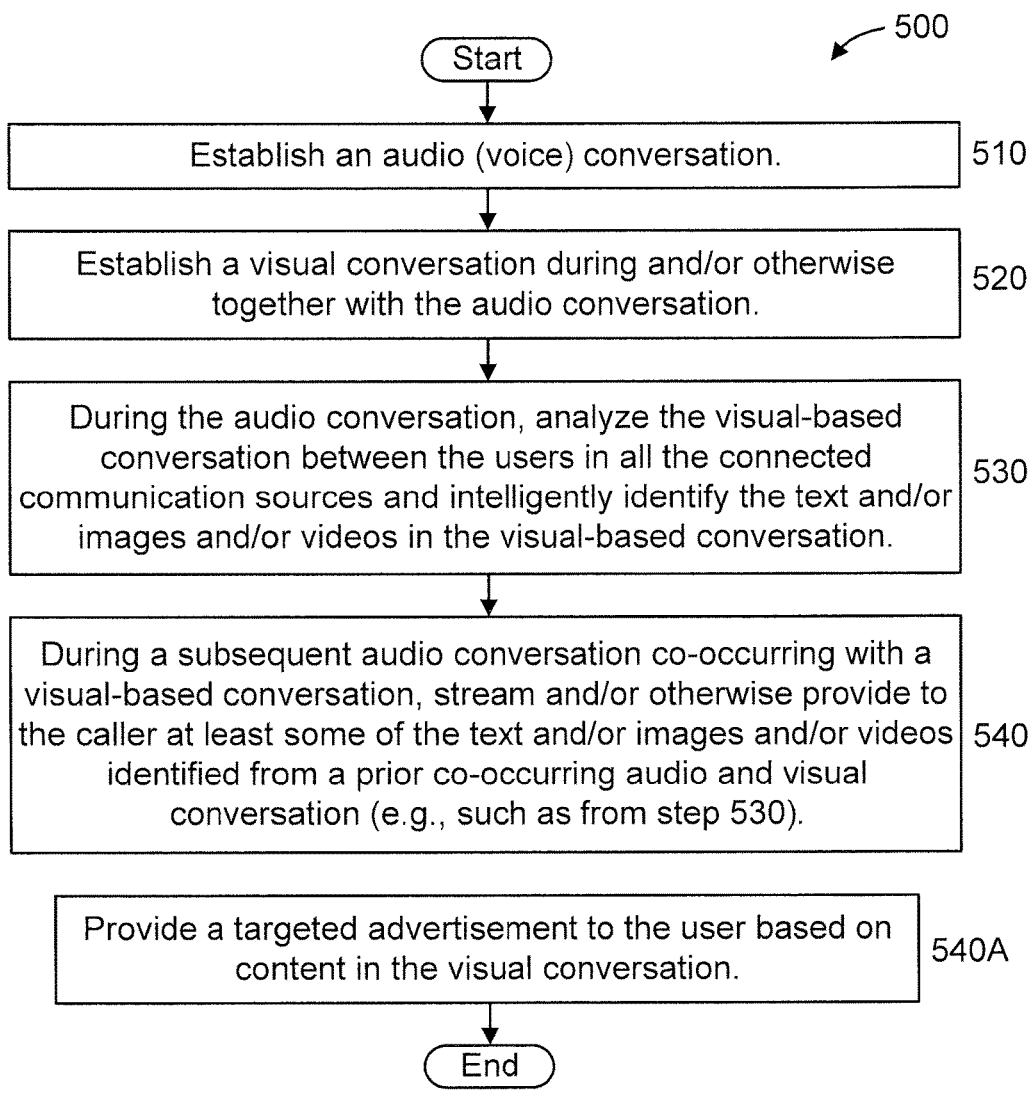
FIG. 5 shows an exemplary method 500 for personalizing the video experience of a caller during telecommunications, in accordance with an embodiment of the present principles.

Further, it is to be appreciated that processing system 100 may perform at least part of the methods described herein including, for example, at least part of method 300 of FIGS. 3-4 and/or at least part of method 500 of FIG. 5. Similarly, part or all of apparatus 200 may be used to perform at least part of method 300 of FIGS. 3-4 and/or at least part of method 500 of FIG. 5.

FIG. 2 shows an exemplary apparatus 200 for personalizing telecommunications for a caller and an operating environment of the apparatus 200, in accordance with an embodiment of the present principles.

The apparatus 200 is embodied in a telecommunication device pertaining to a caller (and is hereafter referred to interchangeably as "caller telecommunication device"200). The caller telecommunication device 200 can be any type of telecommunication device including mobile and stationary telecommunication devices. For example, the telecommunication device can be a mobile telephone (e.g., smart phone), laptop, tablet, desktop computer, and so forth. As is known, the preceding and other devices are able to provide telecommunication for a user thereof. In the embodiment of FIG. 2, the caller telecommunication device 200 is implemented as a smart phone for the sake of illustration.

The caller telecommunication device 200 at least includes a processor, a memory, a speaker, a display, and structural devices for enabling telecommunication (network adapters and so forth). As these elements are shown in FIG. 1, reiterating as noted above that elements in FIG. 1 can also be in the apparatus of FIG. 2, such elements are omitted from FIG. 2 for the sake of brevity and clarity.

The caller telecommunication device 200 further includes an audio analyzer 210, a text analyzer 220, an image/video analyzer (hereinafter "image analyzer", noting that a video is a collection of images that show motion) 230. In an embodiment, the audio analyzer 210 can be implemented at least in part by a speech recognition system.

The caller telecommunication device 200 is configured to engage in telecommunication sessions with other telecommunication devices. Such telecommunication sessions can be audio-based, visual-based, or can involve both of the preceding (and thus, be multimedia-based). Accordingly, the operating environment 299 of the caller telecommunication device 200 includes one or more other telecommunication devices (collectively denoted by the figure reference numeral 277). In the embodiment of FIG. 2, the one or more other telecommunication devices 277 include a tablet 277A, a smartphone 277B, a desktop computer 277C, and a laptop 277D, for the sake of illustration. While the tablet 277A is shown in conjunction with a stylus, a stylus is not required for use by the present principles, and tablets involving other ways (e.g., capacitive, etc.) of interfacing with a user can also be used.

The telecommunication sessions can occur over one or more networks (collectively denoted by the figure reference numeral 288). The one or more networks 288 can include any type of networks such as, for example, but not limited to, cellular networks, local area networks, wide area networks, personal area networks, wireless networks, wired networks, any combination of the preceding, and so forth. In the embodiment of FIG. 2, the one or more networks 288 are implemented by one or more wireless networks for the sake of illustration.

The caller telecommunication device 200 is configured to identify content in a telecommunication session between a caller and one or more other parties.

The caller telecommunication device 200 is further configured to dynamically personalize media provided to the caller on a telecommunication device during at least a portion of a subsequent telecommunication session between the caller and at least one of the one or more other parties based on the identified content in the telecommunication session. The telecommunication session in which content is identified occurs prior to the subsequent telecommunication session during which the personalized media is provided to the caller.

The personalized media provided to the caller can be any of audio media, visual media, and multimedia. The audio media can be, for example, but is not limited to, a summary of an audio conversation from a prior telecommunication session. The visual media can be, for example, but is not limited to, text, images, and videos.

The personalized media provided to the caller can be streamed to the caller during at least the portion of the subsequent telecommunication session. The personalized media provided to the caller can be changed in each further subsequent telecommunication session based on content from a prior telecommunication session. The personalized media provided to the caller can be so provided as a caller tune.

Further, the personalized media provided to the caller can capture a specific signature style (e.g., audio and/or video characteristics) of the callee which is dynamic in nature and play it as reverse caller tune. For example, every user typically has a very specific signature of talking, some often using the same phrases or citing the very same examples, or some does have specific characteristic to them (e.g., a very peculiar way of laughing, and so forth), which can be used as their signature style of talking. Such signature can be used in the personalized media provided to the caller. This and other variations and implementations of the present principles are readily determined by one of ordinary skill in the art given the teachings of the present principles provided herein, while maintaining the spirit of the present principles.

Moreover, in an embodiment, the caller telecommunication device 200 can be configured to provide a targeted advertisement to the caller on the telecommunication device based on the identified content in the telecommunication session.

It is to be appreciated that one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. Variations of the elements of caller telecommunication device 200 are readily determined by one of ordinary skill in the art, given the teachings of the present principles provided herein, while maintaining the spirit of the present principles.

FIGS. 3-4 show an exemplary method 300 for personalizing the audio experience of a caller during telecommunications, in accordance with an embodiment of the present principles.

At step 310, create a summary of an audio (voice) conversation. The audio conversation can involve two or more participants, with the following description continuing for two participants for the sakes of clarity and illustration.

Regarding step 310, it is to be appreciated that there can be multiple approaches used or selected from in order to create a call summary. Such approaches can use, for example, a combination of audio and text analyzers.

In an embodiment, step 310 can include steps 310A-310C.

At step 310A, during the audio conversation, "listen" to the audio conversation, identify the context, and highlight key discussions areas (audio marking). This can also be done when a new context is discussed. Step 310A can be performed by an audio analyzer. Key discussion areas can be determined from words in a predetermined list and/or based on word frequency counts and/or so forth.

At step 310B, index the highlighted part of the audio conversation.

At step 310C, form a summary of the audio conversation (hereinafter interchangeably "audio conversation summary") by collating all (or some) of the indexed parts of the audio conversation.

As a result, in an embodiment, an audio conversation summary can be a collection of snippets of real-time conversations which include can the voice of both parties (caller and callee).

Also, in an embodiment, a transcript of the summary can be generated further analysis.

At step 320, set the audio conversation summary as a caller tune (e.g., reverse caller tune) for one or more subsequent calls to that callee. Thus, the next time (and possible one or more subsequent times after the next time) the user calls the callee, the summary of the previous call is played as a caller tune for that user.

In an embodiment, the audio conversation summary for the previous call (let's call this call 1) between a caller and a callee is used for only the next call (let's call this call 2), whereby the audio conversation summary of the next call is then formed and used for only the next call thereafter (let's call this call 3), and so on, so that the audio conversation summary that is played as a caller tune is different for each call. In this way, monotony is avoided, and the user's interest can be maintained and/or otherwise captured by the new caller tune that is played for each call. Of course, in other embodiments, other settings can be used, such that an audio conversation summary can be used more than once, and so forth. These and other variations of the present principles are readily determined by one of ordinary skill in the art given the teachings of the present principles provided herein, while maintaining the spirit of the present principles.

In an embodiment step 320 includes step 320A.

At step 320A, provide a targeted advertisement to the user based on content in the audio conversation summary. The content can be determined by an audio analyzer. The targeted advertisement can be provided with (that is, any of before, during, and/or after) the caller tune.

At step 330, automatically (or selectively, based on a user input) repeat steps 310 and 320 for all or a subset of the caller's contacts.

In an embodiment, step 330 includes step 330A.

At step 330A, receive a selection, from the caller, of a subset of the caller's contacts for use with method 300.

Thus, every time there is conversation is happening between two or more party (conference) the previous conversation summary is dynamically set every time as caller tune.

It is to be appreciated that the present principles can be applied to any smart communication device using any dialing communication medium including, but not limited to, mobile, Voice Over Internet Protocol (VOIP), and so forth.

In an embodiment, if a caller uses VOIP to make a call and the next time uses mobile communications, the audio conversation summary from the VOIP call can be played for the mobile communications call.

It is to be appreciated that while the embodiment of FIGS. 3-4 is described with respect to two participants in an audio conversation, namely a caller and a callee, the same can be readily extended to more than two participants. For example, there can be a caller and multiple callees in the case of a conference call.

Moreover, the present principles can be applied to a "hold" scenario. In such a scenario, an audio conversation summary can be played for the caller based on, or irrespective of, which party initiated the hold. As a further example relating to hold, Caller A makes a call to B, while the call is connecting, caller A listens to an audio conversation summary and, thereafter, with the call being connected, callee B puts caller A on hold and tries to conference to callee C. In this case, Caller A (being the caller with respect to the callee B) will hear an audio conversation summary relating to caller A and callee B, and caller B (now being a caller with respect to callee C) will hear an audio conversation summary relating to caller B and callee C based on the present principles. The preceding can also be applied to method 500 of FIG. 5, as readily appreciated by one of ordinary skill in the art, given the teachings of the present principles provided herein, while maintaining the spirit of the present principles.

The method of FIGS. 3-4 can be readily applied to these and other scenarios, as readily appreciated by one of ordinary skill in the art given the teachings of the present principles provided herein, while maintaining the spirit of the present principles.

FIG. 5 shows an exemplary method 500 for personalizing the video experience of a caller during telecommunications, in accordance with an embodiment of the present principles. In the embodiment of FIG. 5, a voice conversation can be taking place along with a "visual conversation" involving text or other visual communication media.

At step 510, establish an audio (voice) conversation. The audio conversation can involve two or more participants, with the following description continuing for two participants for the sakes of clarity and illustration.

Regarding step 510, while the audio conversation is taking place, the caller may use a call extension device (e.g., a headphone, a speaker, etc.) and may also have the device display on, with such device display showing the static "ongoing call" icon with a timer or a picture of the callee or a wall paper of the caller's choice.

At step 520, establish a visual conversation during and/or otherwise together with the audio conversation. The visual conversation can include all of the same participants of the audio conversation or a subset thereof. The co-occurrence of an audio conversation and a visual conversation is interchangeably referred to herein as "co-occurring audio and visual conversations".

Thus, in the embodiment of FIG. 5, multiple communication channels are linked together such as, for example, messengers linked with a mobile telephone number. There is a visual conversation occurring between the users in all the linked communication channels such as, for example, but not limited to, e.g., messenger, social media, Short Message Service (SMS), and so forth. As part of visual conversation, text and/or photos and/or videos can be shared between the users.

At step 530, during the audio conversation, analyze the visual-based conversation (which can involve, for example, as mentioned above, text, images, videos, and so forth) between the users in all the connected communication sources and intelligently identify the text and/or images and/or videos in the visual-based conversation.

At step 540, during a subsequent audio conversation co-occurring with a visual-based conversation, stream and/or otherwise provide to the caller at least some of the text and/or images and/or videos identified from a prior co-occurring audio and visual conversation (e.g., such as from step 530). It is to be appreciated that the performance of step 540 depends upon whether the device display is on, as far as providing visual content to the caller.

In an embodiment step 540 includes step 540A.

At step 540A, provide a targeted advertisement to the user based on content in the visual conversation. The content can be determined by a text analyzer and/or an image analyzer and/or a video analyzer. The targeted advertisement can be provided with (that is, any of before, during, and/or after) the content that, in turn, is provided to the user at step 540. For example, the targeted advertisement can be provided on a portion (subset) of the device display along with the content from a prior telecommunication session.

Thus, every time (or a subset thereof) there is conversation occurring between two or more users, all the latest conversation objects (text, images, videos, and so forth) between the users in the connected communication sources can be streamed and/or otherwise provided on the users display screen when it is on.

It is to be appreciated that while the embodiment of FIG. 5 is described with respect to two participants in an audio-based conversation and a visual-based conversation, namely a caller and a callee, the same can be readily extended to more than two participants. For example, there can be a caller and multiple callees in the case of a conference call. The method of FIG. 5 can be readily applied to these and other scenarios, as readily appreciated by one of ordinary skill in the art given the teachings of the present principles provided herein, while maintaining the spirit of the present principles.

An exemplary scenario will now be described to which the present principles can be applied, in accordance with an embodiment of the present principles.

Two users use smart devices to communicate to each other and the users both use, for example, one or more of the following: telecommunications; messenger; Short Message Service (SMS); Voice Over Internet Protocol (VOIP); social media; and so forth. When the caller initiates the call and is waiting to be connected, the previous audio conversation summary can be played as a caller tune.

Moreover, if the device display is on during a current conversation, all (or a subset) of the text, images, and/or other visual media from a previous conversation between the same (or a subset of the) user across one or more connected channels (e.g., audio channels and/or visual channels) can be streamed and/or otherwise provided to the caller during the conversations.

While content is being streamed and/or otherwise provided, the caller (initiator) can select any content, e.g., using a user interface, to not include in the future (during, e.g., a subsequent conversation).

A brief description will now be given of some of the many attendant advantages of the present principles.

As one advantage, a caller can dynamically personalize their audio visual experience during communication as compared to a static experience.

As another advantage, a caller can have a recap of a previous conversation while the caller is waiting for the call to be connected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    identifying, by a telecommunication device having a processor and a memory, content in a telecommunication session between a caller and one or more other parties; and
    dynamically personalizing, by the telecommunication device, media provided to the caller on the telecommunication device during at least a portion of a subsequent telecommunication session between the caller and at least one of the one or more other parties based on the identified content in the telecommunication session, the telecommunication session occurring prior to the subsequent telecommunication session,
    wherein said identifying step comprises creating a summary of an audio conversation occurring in the telecommunication session, and
    wherein said personalizing step comprises determining a signature style of talking of the caller, and setting the summary of the audio conversation occurring in the telecommunication session as a reverse caller tune incorporating the signature style of talking for the subsequent telecommunication session.

2. The method of claim 1, wherein the media is selected from the group consisting of audio media, visual media, and multimedia.

3. The method of claim 2, wherein the visual media comprises visual objects selected from the group consisting of text, images, and videos.

4. The method of claim 1, wherein the telecommunication session is selected from the group consisting of an audio-based conversation, a visual-based conversation, and a multimedia conversation.

5. The method of claim 1, wherein said dynamically personalizing step comprises streaming the media to the caller during at least the portion of the subsequent telecommunication session.

6. The method of claim 1, wherein said creating step comprises:
    performing audio marking to identify key discussion areas;
    indexing the key discussion areas; and
    forming the summary of the audio conversation by collating the indexed key discussion areas.

7. The method of claim 6, wherein the key discussion areas are identified based on identification objects selected from the group consisting of a words in a predetermined list and word frequency counts.

8. The method of claim 1, wherein the media provided to the caller is changed in each further subsequent telecommunication session based on content from a prior telecommunication session.

9. The method of claim 1, wherein the media is provided to the caller during a telecommunication connection time of the subsequent telecommunication session.

10. The method of claim 1, further comprising providing a targeted advertisement to the caller on the telecommunication device based on the identified content in the telecommunication session.

11. The method of claim 10, wherein the targeted advertisement is provided in a form selected from the group consisting of audio advertising content, visual advertising content, and multimedia advertising content.

12. The method of claim 1, further comprising repeating the method for each of a plurality of contacts in a contacts list of the caller.

13. The method of claim 1, wherein the telecommunication session and the subsequent telecommunication session involve both an audio-based conversation and a visual-based conversation.

14. The method of claim 13, wherein the content identified in the telecommunication session is identified from both the audio-based conversation and the visual-based conversation.

15. The method of claim 1, wherein the summary comprises a collection of snippets of real-time conversations which include the voice of the caller and at least one of the one or more other parties.

16. A computer program product for personalizing telecommunications, the computer program product comprising a non-transitory computer readable storage medium having program instructions embodied therewith, the program instructions executable by a processor to cause the processor to perform a method comprising:
    identifying, by a telecommunication device having the processor and a memory, content in a telecommunication session between a caller and one or more other parties; and
    dynamically personalizing, by the telecommunication device, media provided to the caller on the telecommunication device during at least a portion of a subsequent telecommunication session between the caller and at least one of the one or more other parties based on the identified content in the telecommunication session, the telecommunication session occurring prior to the subsequent telecommunication session, wherein said identifying step comprises creating a summary of an audio conversation occurring in the telecommunication session, and wherein said personalizing step comprises determining a signature style of talking of the caller, and setting the summary of the audio conversation occurring in the telecommunication session as a reverse caller tune incorporating the signature style of talking for the subsequent telecommunication session.

17. An apparatus, comprising:

a telecommunication device having a processor and a memory, the telecommunication device being configured to:

identify content in a telecommunication session between a caller and one or more other parties by creating a summary of an audio conversation occurring in the telecommunication session; and dynamically personalize media provided to the caller on the telecommunication device during at least a portion of a subsequent telecommunication session between the caller and at least one of the one or more other parties based on the identified content in the telecommunication session, by determining a signature style of talking of the caller, and setting the summary of the audio conversation occurring in the telecommunication session as a reverse caller tune incorporating the signature style of talking for the subsequent telecommunication session, the telecommunication session occurring prior to the subsequent telecommunication session.

18. The apparatus of claim 17, wherein the telecommunication device comprises an audio analyzer for at least assisting in creating the summary of an audio conversation occurring in the telecommunication session, wherein at least a portion of the summary is included in the media provided to the caller.

19. The apparatus of claim 17, wherein the telecommunication device comprises a text analyzer for at least assisting in identifying the content in the telecommunication session upon which is based the personalizing of the media provided to the user.

* * * * *